(12) United States Patent
Kazama et al.

(10) Patent No.: US 8,880,345 B2
(45) Date of Patent: Nov. 4, 2014

(54) ROUTE GENERATION SYSTEM, ROUTE GENERATION METHOD, AND PROGRAM

(75) Inventors: Yoriko Kazama, Hanno (JP); Toshihiro Kujirai, Kodaira (JP); Takashi Watanabe, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 13/539,552

(22) Filed: Jul. 2, 2012

(65) Prior Publication Data

US 2013/0013204 A1 Jan. 10, 2013

(30) Foreign Application Priority Data

Jul. 7, 2011 (JP) ................................ 2011-150876

(51) Int. Cl.
G01C 21/36 (2006.01)
G01C 21/34 (2006.01)
G01C 21/20 (2006.01)

(52) U.S. Cl.
CPC ............ *G01C 21/3461* (2013.01); *G01C 21/20* (2013.01)
USPC .......................................................... 701/533

(58) Field of Classification Search
USPC .......................................................... 701/533
See application file for complete search history.

(56) References Cited

U.S. PATENT DOCUMENTS

| 6,154,152 | A | 11/2000 | Ito | |
|---|---|---|---|---|
| 6,175,803 | B1 * | 1/2001 | Chowanic et al. | 701/533 |
| 6,470,265 | B1 * | 10/2002 | Tanaka | 701/532 |
| 8,135,538 | B2 * | 3/2012 | Geelen et al. | 701/438 |
| 2006/0015249 | A1 * | 1/2006 | Gieseke | 701/210 |
| 2006/0239537 | A1 * | 10/2006 | Shragai et al. | 382/154 |
| 2008/0189033 | A1 * | 8/2008 | Geelen et al. | 701/209 |
| 2008/0201070 | A1 * | 8/2008 | Kikuchi | 701/209 |
| 2009/0005974 | A1 * | 1/2009 | Lenneman et al. | 701/209 |
| 2010/0027527 | A1 * | 2/2010 | Higgins et al. | 370/351 |
| 2013/0179067 | A1 * | 7/2013 | Trowbridge et al. | 701/410 |

FOREIGN PATENT DOCUMENTS

| JP | 11-119647 | 4/1999 |
|---|---|---|
| JP | 2000-89664 | 3/2000 |
| JP | 2004-246554 | 9/2004 |

* cited by examiner

*Primary Examiner* — James Trammell
*Assistant Examiner* — Michael Berns
(74) *Attorney, Agent, or Firm* — Antonelli, Terry, Stout & Kraus, LLP.

(57) ABSTRACT

Provided is a route generation device capable of generating an appropriate route. A route generation system of one embodiment of the present invention includes: analysis sections that analyze aerial image data to identify the land state of an area included in an aerial image; a storage section that stores traffic cost information associating a traffic-cost coefficient indicating traffic difficulty with the land state; a route searching section that calculates traffic costs of a plurality of routes from a start point to an end point by referring to the analysis results of the analysis sections and the traffic cost information and that determines a route candidate to be used from the start point to the end point based on the calculation results.

15 Claims, 14 Drawing Sheets

FIG. 11

| VEHICLE | WIDTH [m] | LENGTH [m] | ROTATION ANGLE [DEGREE] | MAXIMUM LOADING CAPACITY [TON] | PASSABLE SURFACE | ⋮ | ⋮ |
|---|---|---|---|---|---|---|---|
| HEAVY EQUIPMENT 1 | 2.3 | 5.1 | 120 | 6.5 | PAVEMENT, GRAVEL, DIRT | | |
| HEAVY EQUIPMENT 2 | 1.8 | 3.6 | 140 | 1.2 | PAVEMENT, DIRT, GRAVEL, ROCKY TRACT | | |
| ⋮ | | | | | | | |

| LAND USE | LAND TERRAIN | TRAFFIC WEIGHT | ... |
|---|---|---|---|
| ROAD | ASPHALT | 0.1 | |
| ROAD | GRAVEL | 0.5 | |
| ROAD | DIRT | 0.4 | |
| ROAD | UNPAVED ROAD | 0.8 | |
| | ... | | |
| | LAKE | 1.0 | |
| | RIVER | 1.0 | |
| | POND | 1.0 | |
| | ... | | |
| | TALL-TREE DENSE FOREST | 0.9 | |
| | TALL-TREE OPEN FOREST | 0.7 | |
| | LOW-TREE DENSE FOREST | 0.9 | |
| | LOW-TREE OPEN FOREST | 0.5 | |
| | GRASSLAND | 0.4 | |
| | ... | | |
| | ... | | |

FIG. 14

| TERRAIN | TYPE | TRAFFIC WEIGHT | ... |
|---|---|---|---|
|  |  |  |  |
| SLOPE ANGLE | < 5 DEGREES | 0.1 |  |
|  | 5 DEGREES TO 10 DEGREES | 0.2 |  |
|  | 10 DEGREES TO 15 DEGREES | 0.4 |  |
|  | 15 DEGREES TO 20 DEGREES | 0.6 |  |
|  | ... |  |  |
| ... |  |  |  |
|  |  |  |  |

123

ROUTE GENERATION SYSTEM, ROUTE GENERATION METHOD, AND PROGRAM

CLAIM OF PRIORITY

The present application claims priority from Japanese patent application JP 2011-150876 filed on Jul. 7, 2011, the content of which is hereby incorporated by reference into this application.

FIELD OF THE INVENTION

The present invention relates to a route generation system, a route generation method, and a program for causing a computer to execute route generation.

BACKGROUND OF THE INVENTION

There are technologies in which, when the destination is set, the current location is grasped, and the optimum driving route is selected and presented, like those used in car navigation systems. Furthermore, there are technologies in which a road is estimated from the actual driving history of a vehicle etc. even in a situation in which a road map does not reflect the current states because information of the road map has not been updated, for example.

In a technology described in Japanese Unexamined Patent Application Publication No. Hei11-119647, held road data is compared with driving data, and road data that has not been held is collected. Furthermore, there is a technology in which the shapes of roads are extracted from an aerial image and are reflected on the road map in the form of a road network. In a technology described in Japanese Unexamined Patent Application Publication No. 2004-246554, areas corresponding to roads are extracted from a color image, and road vectors are generated.

From an aerial image, it is possible not only to extract the shapes of roads but also to grasp the state of a wide range of land. Japanese Unexamined Patent Application Publication No. 2000-89664 describes a technology in which the states of land cover are extracted from an aerial image, such as a satellite image, and ecological environment features are detected to make a land use plan.

SUMMARY OF THE INVENTION

When roads have been developed, even if the actual roads are not reflected in a road map, the driver can determine the actual road state to drive the vehicle. However, in a region where roads are undeveloped or in a region where roads become impassable due to a disaster, the driver may not be able to pass through such a region because the driver cannot obtain information indicating how to pass through the region. In the above-descried situation, it may be difficult to grasp the current states through ground-based observation. The present invention has been made to solve the above-described problems, and an object thereof is to generate an appropriate route according to the surrounding situations.

According to an aspect, the present invention provides a route generation system that generates a route between a start point and an end point, including: an analysis section that analyzes aerial image data to identify a land state of an area included in the aerial image data; a storage section that stores traffic cost information that associates a traffic-cost coefficient indicating traffic difficulty with the land state; and a route search section that calculates traffic costs of a plurality of routes from the start point to the end point by using the analysis result output from the analysis section and the traffic cost information and that determines a route candidate to be used from the start point to the end point based on the calculation results.

According to one aspect of the present invention, an appropriate route reflecting the current states can be generated by analyzing the land states from aerial image data.

BRIEF DESCRIPTION OF THE DRAWINGS

FIG. 11 is a diagram showing an example structure and example data of vehicle data according to the sixth embodiment;

FIG. 13 is a diagram showing an example structure and example data of setting data according to the first embodiment;

FIG. 14 is a diagram showing an example structure and example data of the setting data according to the first embodiment.

DETAILED DESCRIPTION OF THE PREFERRED EMBODIMENTS

Figure 1:
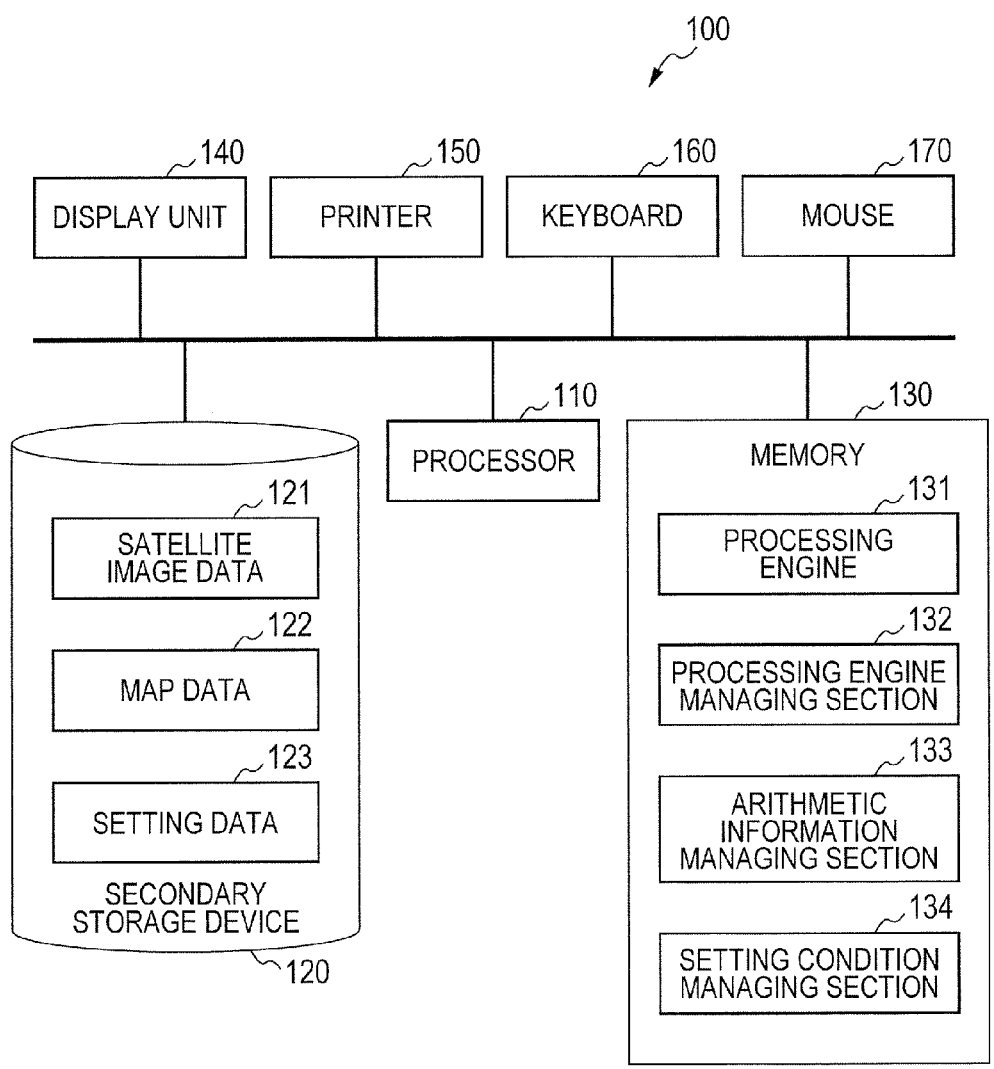
FIG. 1 is a functional block diagram schematically showing the configuration of a route generation device according to a first embodiment.

An embodiment for implementing the present invention will be described below. For clarification of explanation, the following description and the drawings are partly omitted or simplified according to circumstances. Furthermore, for clarification of explanation, the description is not repeated as needed.

A route generation device of this embodiment searches for a route from a start point to an end point (destination) according to land states obtained by analyzing an aerial image. The aerial image is formed of one or more spectra acquired at an aerial platform, such as a satellite and an aircraft. By analyzing the aerial image, appropriate route candidates can be determined in an area where there is no map information or there are no roads, or in land where map information does not match the current land states.

The route generation device of this embodiment is effective for use in route search in land where there are no roads between the start point and the end point, for example, for a case of tree planting in a desert or in route search in land where roads exist but are not available for traffic due to obstacles.

The land state is the state of land of a target area. The land state is a superordinate concept term encompassing terrain, land cover, and a land use state, and is identified by all or part of them. The terrain includes the heights and the shapes of ups and downs of land surfaces (including ground surfaces and artifacts), and terrain data includes data of altitude and building height.

The land cover indicates the physical state of a land surface. The land cover of each area is classified into predetermined types, for example, concrete, asphalt, tall-tree dense forest, low-tree dense forest, tall-tree open forest, low-tree open forest, grassland, water surface, dirt, and gravel. Furthermore, the land cover also includes classifications (values) of roughness and hardness of a land surface. In this way, the land cover indicates the state of a land surface. The land use indicates the use of land by people or the meaning of land for people. The land use state of each piece of land (area) is classified into predetermined particular types, such as road, farmland, and park.

By analyzing an aerial image, information about the terrain state and the land cover can be obtained. The land use state can be obtained from map data, and information about the land use state of part of an area can also be obtained from the terrain state and the land cover. The map data can include information about the terrain and/or the land cover, in addition to the information about the land use state.

The route generation device can refer to the map data, for example, to reflect it in the analysis of the aerial image. Alternatively, the route generation device can reinforce the analysis of the aerial image with the map data. If the land state is not changed or has been slightly changed, from when the map was generated, or if there is accurate map data of a target area, the use of the map data is effective.

The route generation device of this embodiment estimates the land state of a target area by analyzing the aerial image and also by referring to the map data, as needed. The route generation device determines appropriate route candidates from the start point to the end point based on the estimated land state and presents them to the user. It is preferred that the route generation device estimates the terrain state and the land cover from the aerial image; however, the route generation device may estimate or refer to only one of them to perform route search. The route generation device may refer to the map data when available or may not use the map data.

The route generation device of this embodiment calculates traffic costs (total traffic costs) from the start point to the end point, in route search, to determine appropriate route candidates. The route generation device holds definition information that associates a land state with a traffic cost, specifically, definition information that associates each land state type with a traffic weight that indicates a traffic cost per unit distance. It is preferred that the traffic weight be defined for each type of vehicles.

The route generation device identifies the land states of areas to be passed in a route from the start point to the end point and calculates the traffic cost for passing through each area by multiplying the passing through distance of the area by the traffic weight. A value obtained by adding the traffic costs of all passing through areas is the total traffic cost of the route. A route having a lower total traffic cost is an appropriate route candidate.

Embodiments will be described below. Part of the configuration of an embodiment can be replaced with the configuration of another embodiment, and the configuration of an embodiment can be added to the configuration of another embodiment. Part of the configuration of each embodiment can be deleted or replaced with another configuration, or the another configuration can be added thereto.

First Embodiment

FIG. 1 is a functional block diagram schematically showing the configuration of a route generation device 100 according to a first embodiment of the present invention. The route generation device 100 includes a processor 110, a secondary storage device 120, a memory 130, a display unit 140, a printer 150, a keyboard 160, and a mouse 170. Furthermore, the route generation device 100 is provided with a network interface (not shown) and is capable of receiving sensor data from an external sensor via a network.

The processor 110 is an arithmetic device, such as a CPU (central processing unit) or an MPU (micro processing unit), and executes programs stored in the memory 130. Furthermore, the processor 110 controls functional sections of the route generation device 100. For convenience of explanation, a description will be given below of cases where actions are performed by the programs; however, these programs are actually executed by the processor 110.

The secondary storage device 120 is a non-volatile storage unit, such as a hard disk drive or an SSD (solid state drive). In the example of FIG. 1, the secondary storage device 120 stores satellite image data 121, map data 122, and setting data 123. The details of these pieces of data will be described later. The secondary storage device 120 may be an external storage that is connected via a network.

The memory 130 is a primary storage unit that holds data (including programs) required for the processor 110 to operate. In the example of FIG. 1, the memory 130 stores a processing engine 131, a processing engine managing section 132, an arithmetic information managing section 133, and a setting condition managing section 134. They are programs (including modules). For convenience of explanation, the programs are shown in the memory 130; however, the programs are typically stored in a storage area in the secondary storage device 120, loaded therefrom into a storage area in the memory 130, and executed by the processor 110.

The processing engine 131 is a program that describes a procedure for processing data input to the route generation device 100 or held data. The details thereof will be described later with reference to FIG. 5. The processing engine managing section 132 is a program that issues instructions to program modules included in the processing engine 131.

The arithmetic information managing section 133 is a program that manages a processing result of the processing engine 131. The setting condition managing section 134 is a program that manages conditions set by the user in the route generation device 100 and the other input information.

The processor 110 realizes predetermined functions by executing the programs stored in the memory 130. The memory 130 stores the programs to be executed by the processor 110 and data required to execute the programs. The programs are executed by the processor 110 to perform predetermined processing while using the storage units and a communication port (communication device). Therefore, in the description of this embodiment and other embodiments, the processor 110 may be used as the subject instead of the programs. Or the processing performed by the programs may correspond to the processing performed by a computer and a computer system in which the programs are operated.

In this way, the processor 110 is operated according to the programs, thereby acting as the functional sections for realizing the predetermined functions. In this example, the processor is operated according to the above-described programs, thereby functioning as the processing engine, the processing engine managing section, the arithmetic information managing section, and the setting condition managing section.

The display unit 140 displays, on the screen, the processing result of the processing engine 131 and other data. The printer 150 is a unit that prints the processing result of the processing engine 131 and other data. These units serve as output units that output the processing result of the route generation device 100. The keyboard 160 and the mouse 170 are input units through which the user of the route generation device 100 gives operation instructions to the route generation device 100. The route generation device 100 can be provided with output units and input units that are different from the above-described units.

Figure 2:
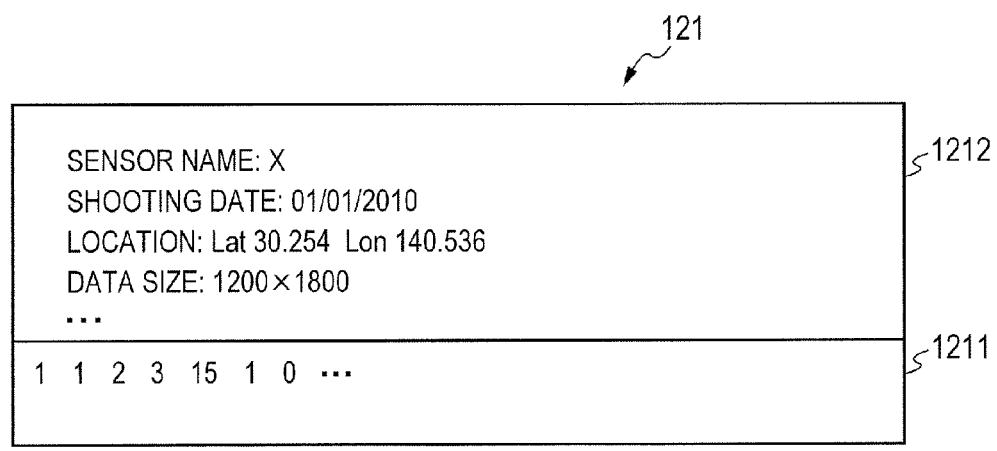
FIG. 2 is a diagram showing an example structure and example data of satellite image data according to the first embodiment.

FIG. 2 is a view showing an example structure and example data of the satellite image data 121. A sensor installed in the platform of a satellite etc. measures a land surface to be observed and records metadata describing measurement conditions and the measured data in a recording medium. The route generation device 100 receives this record data via a network and accumulates it in the secondary storage device 120 as the satellite image data 121.

The satellite image data 121 has a data field for holding measured data 1212 and metadata 1211 that holds measured-data format information and measurement conditions, such as a sensor name, a shooting date, the location of a shooting place, and a data size. Here, as an example, the metadata and the measured data are held in the same data field; however, the metadata and the measured data may be held in different data fields or as different files.

In this example, the satellite image data acquired by the sensor installed in the satellite is used as an example aerial image. However, the route generation device 100 can use an aerial image that is acquired by a sensor or a camera installed in another platform of an aircraft or a helicopter, for example.

Although the content of the map data 122 is not shown, map data available for general use is made up of nodes and links and is a data group that holds location information. Furthermore, the map data includes various types of attribute data. The route generation device 100 uses the location information held by the satellite image data 121 and the map data 122 to associate these pieces of data.

The map data 122 can hold road data. In addition, the map data 122 can include altitude data indicating the terrain and a current-state map indicating the land use. As described above, the terrain includes the heights and the shapes of ups and downs of land surfaces (including ground surfaces and artifacts), and terrain data includes data of altitude and building height. The land use state is the state of land used by people. Specifically, the land use state shows what the area (land) means for people. For example, the land use state of each piece of land (area) is classified into predetermined particular types, such as road, farmland, park, grassland, lake, and river.

FIGS. 13 and 14 are diagrams showing example structures and example data of the setting data 123. The setting data 123 describes a traffic weight corresponding to the land state. The traffic weight is an index indicating the level of difficulty of passing of a vehicle, and is a value per unit distance. In this example, as it is more difficult for a vehicle to pass, the traffic weight is increased. The traffic cost of a particular route is the sum of values obtained by multiplying the traffic weights of respective parts in the route by the distances of the parts. As the traffic cost of the route is lower, the vehicle can go to the destination more easily, that is, the difficulty to reach the destination is lower.

In the example definition table of FIG. 13, the land state associated with the traffic weight is identified by the land use state and the land cover. The land use state can be obtained from the map data 122. The example of FIG. 13 uses only road information. Specifically, the entries in the definition table of the FIG. 13 are classified into entries of road areas and entries of non-road areas.

Furthermore, different types of the land cover are assigned to the respective entries. As described above, the land cover indicates the physical state of a land surface. The land cover of a target area can be identified by analyzing the satellite image data 121. In the example of FIG. 13, a single entry includes data of the land use and the land cover; however, it may not include information about the land use.

For example, when the land use state is road, the road may have different surface states, such as paved with asphalt and covered with gravel and dirt. The traffic weight is defined for each state (type). The traffic weight is defined for each circumstance such as easy passing on a paved road and difficult passing on a gravel road. In addition, the land cover can include the types of the land surface, such as roughness and hardness.

Similarly, in FIG. 14, a traffic weight corresponding to the terrain is described. The traffic weight is defined, for example, for a slope angle, which is the angle of a slope, among elements of the terrain. For example, the traffic weight is set high when the slope is steep because it is not easy to pass through a steep slope, and the traffic weight is set low for a flat place.

The route generation device 100 identifies elements of the land state defined in FIGS. 13 and 14 in the land states of the areas in a route and calculates the products of the traffic weights corresponding to the elements and the distances in the areas. The route generation device 100 selects the larger of two traffic cost values, for example, as the traffic cost of the area. The route generation device 100 may calculate the traffic cost of an area by using an integral value of two traffic weights, for example, the product of the two traffic weights. In this example, a value obtained by multiplying the product of the two traffic weights by a coefficient is used.

In the examples of FIGS. 13 and 14, the traffic weight is separately assigned to the land cover and the terrain; however, the traffic weight may be assigned to a pair of the land cover and the terrain. Specifically, the land cover and the terrain are included in a single entry, and the traffic weight is defined for that entry. The relationships between the traffic weights (traffic costs) and the land states are not necessarily listed in advance, unlike the case described above. For example, as information that associates a land state with the traffic weight, a function that defines the relationship between a slope angle having continuous values and the traffic weight may be used.

The route generation device 100 can also use data indicating impassability at a particular location. For example, when an obstacle that cannot be removed exists in a route, the route is impassable, so that the route is removed from route candidates. The route generation device 100 can identify obstacles by analyzing the satellite image data 121. The method of identifying obstacles will be described later.

In a preferred configuration, the route generation device 100 receives conditions for the states of land where the user wants to pass (specified conditions) from the user. The route generation device 100 searches for a route according to the specified conditions set by the user. Specifically, the user specifies passable land states. The route generation device 100 searches for a route made up of areas having the specified land states. In other words, the route generation device 100 performs route search while avoiding areas having land states different from the specified land states. Specifying land states to be avoided is equivalent to specifying passable land states.

For example, the user selects the types of the land cover and the slope angles of land where the user wants to pass and specifies such that the types of the land cover and the slope angles that are not selected are deleted. The route generation device 100 stores the specified conditions received from the user, in the setting data 123 of the secondary storage device 120. In route search, the route generation device 100 refers to the setting data 123 to search for a route candidate having a low traffic cost, according to the set specified conditions while avoiding impassable areas.

Figure 3:
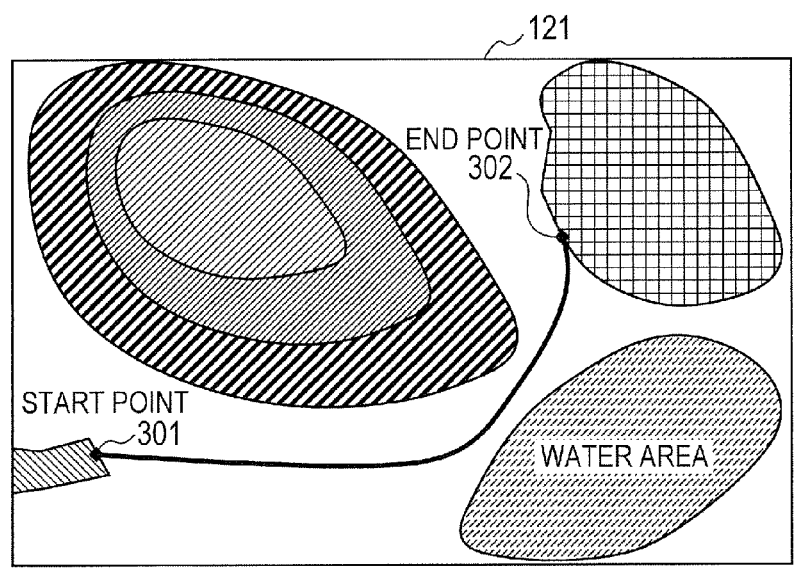
FIG. 3 is a conceptual diagram showing a method in which the route generation device searches for a route from a start point to an end point, according to the first embodiment.

Next, the operation of the route generation device 100 will be described. FIG. 3 is a conceptual diagram showing how the route generation device 100 generates a route passing through a start point 301 and an end point 302 that are specified by the user. It is assumed that a road is severed and no road exists between the specified start point 301 and end point 302.

It is difficult for the user to grasp the land states of areas to the end point 302, and, for example, if the shortest straight route from the start point 301 to the end point 302 is selected, the user may encounter an impassable area, such as a water area. Thus, it is necessary to grasp the current land states in advance and to obtain information about the land cover and the terrain that are suitable for traffic; however, it may be difficult to grasp the current states, in some cases.

Therefore, in this embodiment, the satellite image data 121, which is acquired by shooting a target area, is analyzed to grasp the current land states. The satellite image data 121 includes data acquired by shooting the states of land, and the route generation device 100 can obtain information about the land states, such as a water area and a slope. The route generation device 100 can utilize the above-described information to generate the optimum route reflecting the current land states according to the specified conditions indicated by the setting data 123, such as a route having gentle slopes without a water area and a forest area.

Figure 4:
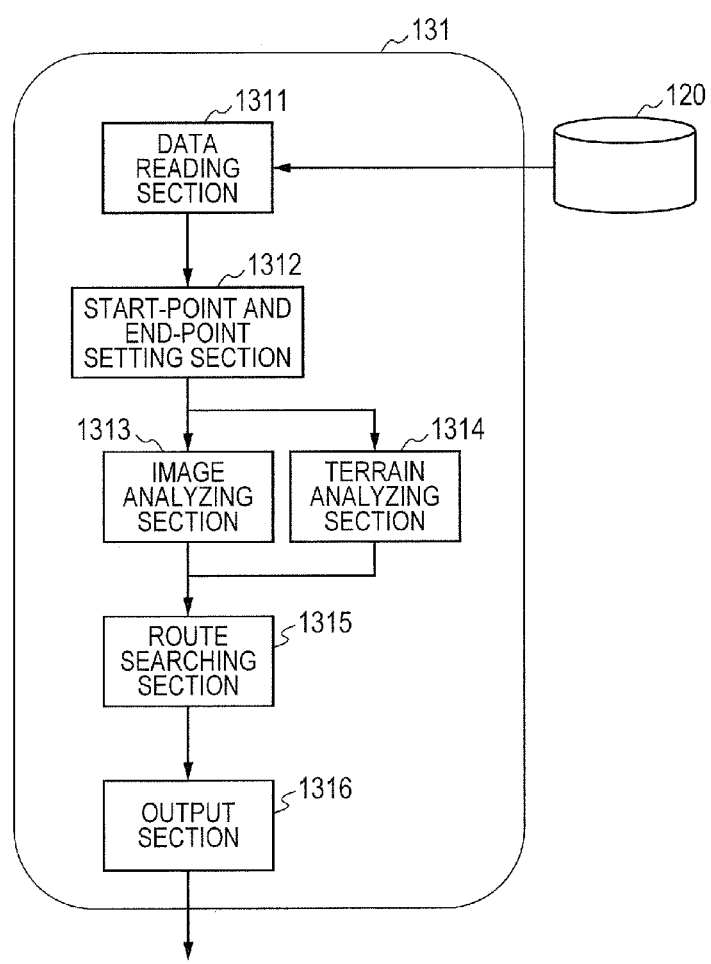
FIG. 4 is a diagram showing, in detail, program modules included in a processing engine according to the first embodiment.

FIG. 4 is a diagram showing, in detail, the program modules included in the processing engine 131. The processing engine 131 includes a data reading section 1311, a start-point and end-point setting section 1312, an image analyzing section 1313, a terrain analyzing section 1314, a route searching section 1315, and an output section 1316. These sections are configured as the program modules included in the processing engine 131.

The data reading section 1311 reads the satellite image data 121 and the map data 122 of a target area from the secondary storage device 120. The start-point and end-point setting section 1312 associates the start point and the end point specified by the user with particular locations on the satellite image data 121 by using location information.

The image analyzing section 1313 analyzes the satellite image data 121 read by the data reading section 1311. For example, the image analyzing section 1313 can classify observation spectral data acquired by a sensor for wavelengths installed in the satellite and held by the satellite image data 121 for each pixel, by a predetermined method, to generate a land cover map that includes a water area, a forest area, and a bare area.

Figure 12:
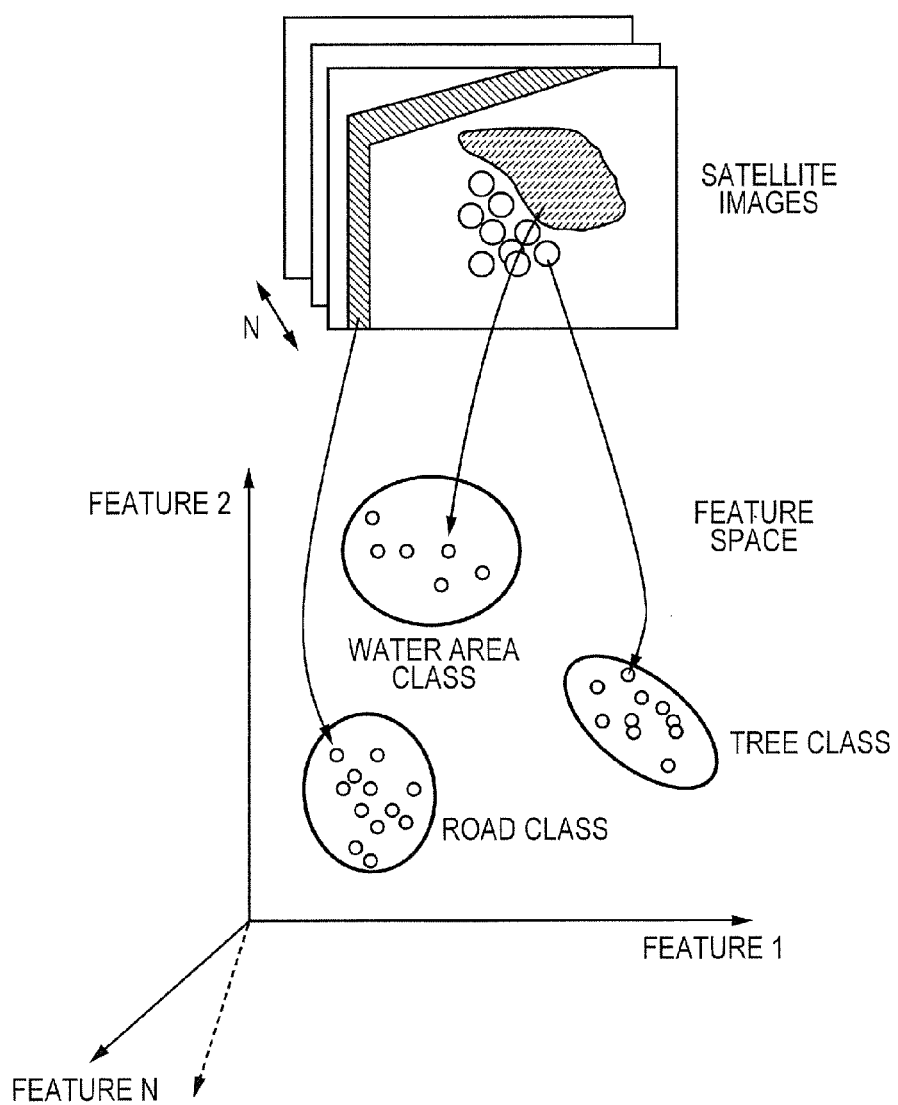
FIG. 12 is a conceptual diagram showing how the route generation device analyzes satellite image data to generate a classification map, in the first embodiment.

FIG. 12 is a conceptual diagram showing how the land cover map is generated from the satellite image data 121. When a sensor with a spectral count of N is used to acquire satellite images, N satellite images corresponding to the respective spectra are acquired. The image analyzing section 1313 plots the acquired spectral data of each pixel on a feature space having feature axes of the spectra and classifies them into clusters. For example, they are for water areas, trees, and roads.

The distribution of clusters on the feature space and the land cover types are associated in advance, so that the image analyzing section 1313 can refer to the information associating them to determine the land cover class corresponding to the spectra of the pixel in question. Thus, the image analyzing section 1313 can perform land cover classification for the range of the satellite images to generate the land cover map.

Feature vectors that the image analyzing section 1313 uses in the image analysis for identifying the land states are defined in advance. The image analyzing section 1313 may use, as feature amounts (feature vectors) for defining the feature space, not only the above-described spectral data but also color information held by the aerial image or texture information indicating changes in pixel values between pixels.

The image analyzing section 1313 may perform the classification processing for each pixel or may perform the classification processing for each area having adjacent pixels that satisfy a particular condition. Since various technologies for identifying land states through image analysis have been widely known, a more detailed description thereof will be omitted here. The image analyzing section 1313 uses an appropriate method selected by design.

The terrain analyzing section 1314 extracts terrain information, such as the altitude of a land surface and the building height, from the satellite image data 121 read by the data reading section 1311. For example, the terrain analyzing section 1314 can extract the altitude of a land surface by using a pair of stereoscopic images. The terrain analyzing section 1314 may extract surface terrain information from altitude information acquired by laser equipment installed in an aircraft etc. Furthermore, the terrain analyzing section 1314 may acquire terrain information by using altitude information included in the map data 122 read by the data reading section 1311 or may use an altitude map.

The terrain analyzing section 1314 can calculate the angle of a slope from the altitude data extracted as described above. The terrain analyzing section 1314 can obtain the slope angle per unit area by calculating the altitude difference from the altitude data of a surrounding area. As many methods for terrain analysis have been known as methods for identifying the land cover through image analysis. Therefore, a more detailed description thereof will be omitted in this specification. The terrain analyzing section 1314 uses an appropriate method selected by design.

The route searching section 1315 searches for the optimum traffic route by using data of the land surface state (land cover) generated by the image analyzing section 1313 and the terrain data generated by the terrain analyzing section 1314. The route searching section 1315 searches for a route that passes through areas having land states satisfying the specified conditions, which are set by the user in advance and managed by the setting condition managing section 134, and that also has the lowest traffic cost.

For example, the user may specify, as specified conditions, places to be excluded from a route, such as steep slopes and water areas. In that case, the route searching section 1315 excludes, from a route search range, water areas from the land-cover classification map, which is obtained through the analysis of the image analyzing section 1313. Furthermore, the route searching section 1315 excludes, from the route search range, places having angles equal to or larger than the angle specified for steep slopes from the information about slope angles, which is obtained through analysis of the terrain analyzing section 1314.

When a plurality of conditions are specified for one spot or area, the route searching section 1315 integrates these conditions. The route searching section 1315 can use OR operation for integration, for example. Alternatively, the route searching section 1315 may numerically express the percentages of matching the conditions and determine whether the spot or area matches the conditions by comparing the product of the percentages with a threshold.

After excluding the non-target areas specified by the user, the route searching section 1315 calculates the traffic costs of routes in the rest areas, to search for appropriate routes. A route having the lowest total traffic cost is the optimum route. As described above, the route searching section 1315 can calculate the traffic costs from the output of the image analyzing section 1313 and the output of the terrain analyzing section 1314. The route searching section 1315 reads the setting data 123, set in advance, and obtains traffic weights corresponding to output results of the image analyzing section 1313 and the terrain analyzing section 1314.

For example, as one method for route search, the shortest distance route from the start point to the end point is extracted. The traffic cost of the shortest distance route is calculated, and the route is used as one route candidate. Next, an area having the largest traffic weight is extracted from the shortest distance route, and this area and areas having traffic weights larger than this area are excluded from a route search range. A route that does not pass through those excluded areas and that has the shortest distance is searched for. The traffic cost of the found route is calculated, and the found route is used as one route candidate. A plurality of route candidates are similarly extracted. If no route exists after areas having larger traffic weights are excluded, a route that takes the shortest path through those areas having larger traffic weights is searched for.

Furthermore, as one method for route search, a plurality of points are set in an area that includes the start point and the end point. The points may be set at appropriate intervals in a grid-like manner. Routes that pass through the points are all extracted, and the traffic costs between the points are calculated. A route that passes through the points and that has the lowest traffic cost from the start point to the end point is extracted as the optimum route candidate. The extracted routes may be sorted in the order of traffic cost, and a plurality of routes having lower traffic costs may be extracted as candidates.

Among the extracted route candidates, a route that has the lowest traffic cost is presented as the optimum route. Alternatively, all of the extracted routes may be presented, or only a specified number of routes among the extracted routes may be presented in ascending order of traffic cost. When a plurality of routes are presented, if the traffic costs and the distances of the routes are also presented, they serve as auxiliary information for the user to select a route.

For example, the route searching section 1315 obtains a traffic weight of 0.1 from the setting data 123, for a pixel that has been determined to be a road area paved with asphalt from the output result of the image analyzing section 1313. Similarly, the route searching section 1315 obtains traffic weights for all pixels in an analysis target range. Furthermore, when the slope angle is obtained from the output result of the terrain analyzing section 1314, the route searching section 1315 can refer to the setting data 123 to determine the traffic weight corresponding to the slope angle. The route searching section 1315 can calculate the traffic cost of each pixel from the distance and the traffic weight allocated to the pixel.

When the traffic weight obtained from the output result of the image analyzing section 1313 and the traffic weight obtained from the output result of the terrain analyzing section 1314 are different at the same spot, the route searching section 1315 employs the traffic weight having the highest value. Alternatively, the route searching section 1315 may use the product of a plurality of traffic costs.

Through the above-described procedure, the traffic cost of each area or pixel is calculated and stored in the secondary storage device 120. In route search, the route searching section 1315 calculates the total traffic costs of a plurality of routes from the start point to the end point, set by the start-point and end-point setting section 1312. The route searching section 1315 searches for a route having the lowest total traffic cost. The search result of the route searching section 1315 can include only a route having the lowest total traffic cost or both the route having the lowest total traffic cost and other route candidates. For example, the route searching section 1315 selects a predetermined number of routes from among routes having lower total traffic costs, as route candidates.

The output section 1316 displays the routes found by the route searching section 1315 on the screen of the display unit 140 or outputs them to the printer 150. When a plurality of routes are displayed, the output section 1316 also outputs the values of the distances and the total traffic costs of the routes, at the same time.

Figure 5:
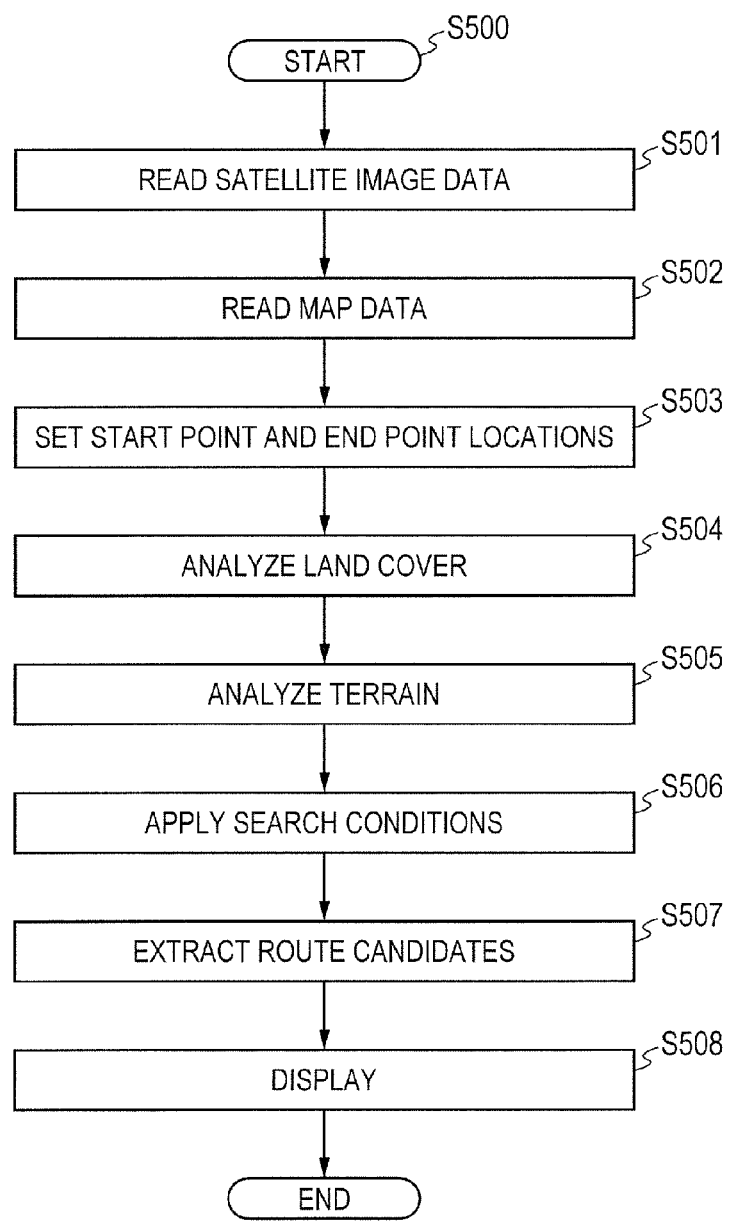
FIG. 5 is a processing flow for explaining processing in which the route generation device generates a route, according to the first embodiment.

FIG. 5 is a processing flow for explaining processing in which the route generation device 100 searches for the optimum route from the satellite image data 121 and the map data 122. The flowchart of FIG. 5 will be described below. In S500, the user of the route generation device 100 uses the input units, such as the keyboard 160 and the mouse 170, to instruct the route generation device 100 to generate routes from the satellite image data 121 and the map data 122.

The processor 110 receives that instruction to start this processing flow. It is assumed that the route generation device 100 has obtained the satellite image data 121 and the map data 122 in advance and has stored them in the secondary storage device 120. First, in S501, the data reading section 1311 reads the satellite image data 121 from the secondary storage device 120 and obtains the location information included in the metadata of the satellite image data 121.

In S502, the data reading section 1311 reads the map data 122 from the secondary storage device 120. The data reading section 1311 links the satellite image data 121, read in S501, with the map data 122 by using the obtained location information. The output section 1316 outputs the satellite image data 121 linked with the map data 122 to the display unit 140. The output section 1316 may display only the satellite image data 121 or the map data 122, may display the pieces of data in a superimposed manner, or may display the pieces of data in separate windows.

In S503, the user of the route generation device 100 uses the keyboard 160 etc. to set a start point and an end point on the displayed satellite image data 121 or the map data 122. The start-point and end-point setting section 1312 obtains the location information about the start point and the end point, set by the user, and stores it in the setting condition managing section 134 of the memory 130.

In S504, the image analyzing section 1313 performs landcover classification processing for the entire image, by using spectral information of the satellite image data 121. The image analyzing section 1313 may perform the classification processing for only a desired-shaped area that includes the start point and the end point, from the locations of the start point and the end point set by the start-point and end-point setting section 1312. In S505, the terrain analyzing section 1314 extracts the terrain information from the satellite image data 121. The terrain analyzing section 1314 may extract the terrain information from the map data 122.

In S506, the route searching section 1315 applies specified conditions indicated by the setting data 123, managed by the setting condition managing section 134, to the results of analysis of the image analyzing section 1313 and the terrain analyzing section 1314. For example, the route searching section 1315 applies, for example, a condition in which steep slopes are avoided, by using the slope angle information, which is obtained from the terrain data. Furthermore, the route searching section 1315 extracts a water area and a building area from the result of image analysis and applies, for example, a condition in which those areas are avoided.

In S507, the route searching section 1315 uses an image or a map in which the above-described specified conditions are reflected to search for routes that pass through areas satisfying the above-described specified conditions, among routes from the start point to the end point set by the start-point and end-point setting section 1312. In the route search, the route searching section 1315 calculates the total traffic costs of the routes.

The method of calculating a total traffic cost is as described above; the traffic weight of each pixel or each area in a route is identified by referring to the setting data 123, and the product of the traffic weight and the traffic distance is obtained as a traffic cost. The sum of traffic costs in the route is the total traffic cost of the route. The route searching section 1315 extracts, as route candidates, one or more routes having total traffic costs lower than other routes.

In S508, the output section 1316 displays the one or more route candidates found through the above-described steps, on the display unit 140. The output section 1316 may superimpose the one or more routes on the satellite image data or on the map data. Furthermore, the output section 1316 may output the one or more routes to the printer 150.

As described above, the route generation device 100 of the first embodiment generates, from the satellite image data 121 and the map data 122, the optimum route to a desired destination and presents the route to the user by using the display unit 140 etc. Thus, the user can grasp the route suitable for traffic even in a place where there are no roads.

Second Embodiment

In the first embodiment, even when no roads exist, the optimum route that passes through the start point and the end point, set in advance, can be generated by using the satellite image data 121 and the map data 122. On the other hand, when the destination is not clear or when a target area is wide, it is conceivable that the user does not know where the end point should be set.

Therefore, in a second embodiment, a description will be given of an example configuration in which spot candidates for an end point, which is the destination, are extracted from the satellite image data 121 and the map data 122, and the end point is determined in consideration of routes. Since the other configurations are the same as those of the first embodiment, a description will be given below mainly of the differences from the first embodiment.

Figure 6:
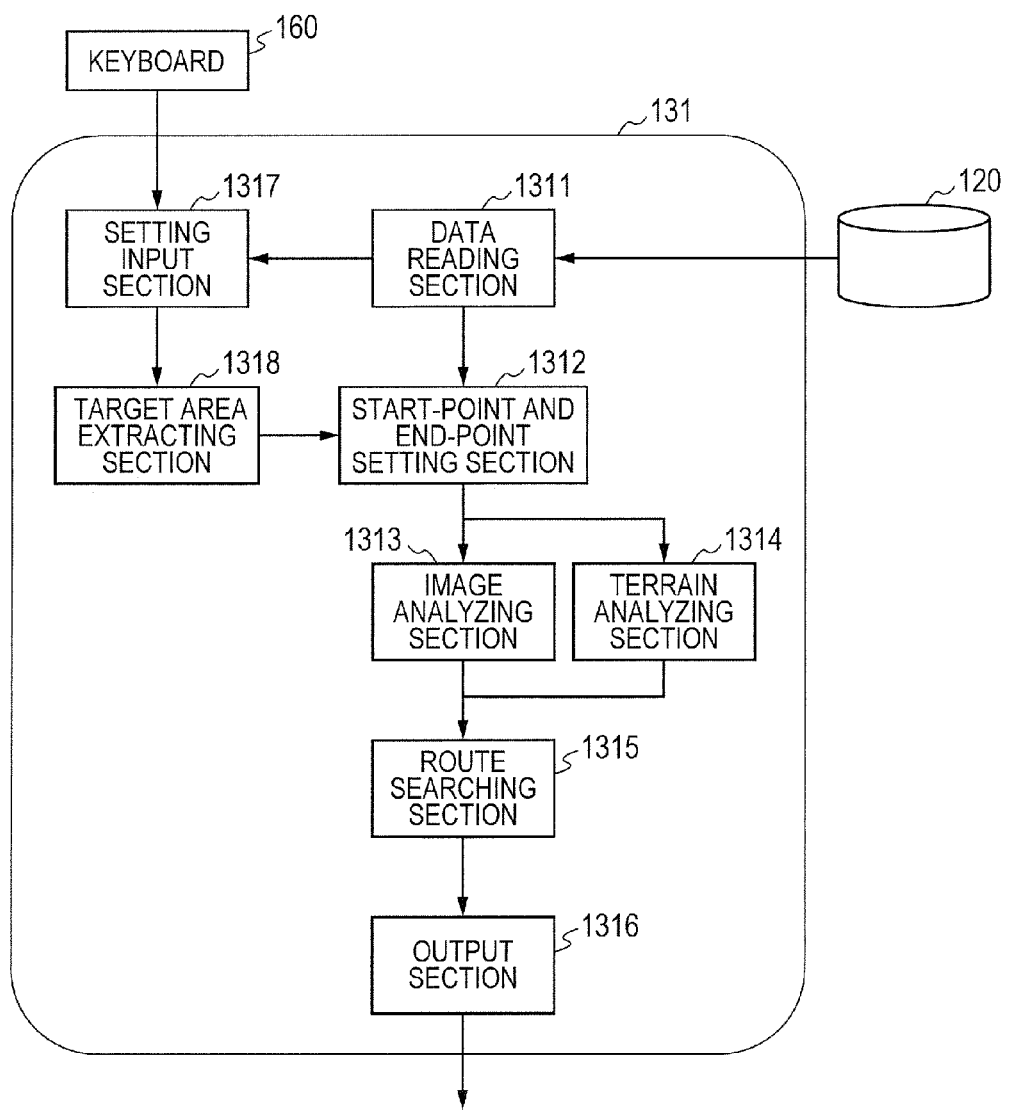
FIG. 6 is a diagram schematically showing a module configuration of a processing engine provided in a route generation device according to a second embodiment.

FIG. 6 is a diagram showing a module configuration of the processing engine 131 provided in the route generation device 100 of the second embodiment. In the second embodiment, the processing engine 131 includes a setting input section 1317 and a target area extracting section 1318, in addition to the configuration described in the first embodiment with reference to FIG. 4. The setting input section 1317 and the target area extracting section 1318 are configured as program modules included in the processing engine 131, as in the other functional sections.

The setting input section 1317 receives setting conditions input by the user using the keyboard 160 and transmits the setting conditions to the setting condition managing section 134. The setting conditions include a condition for determining the destination and specified condition. The user may select the condition from setting conditions displayed on the display unit 140, by using the mouse 170.

The user inputs, as the condition for determining the destination, a land-state condition that should be satisfied by the destination, on a satellite image or a map displayed on the display unit 140. The user may input a target area as the condition. Furthermore, the user may input an impassable area or an intermediate spot to be passed, as the specified condition. The setting input section 1317 receives location information of the area input by the user on the display unit 140 and transmits the location information and attribute information that indicates passability or impassability to the setting condition managing section 134.

The target area extracting section 1318 extracts regions (areas or spots) that satisfy the conditions managed by the setting condition managing section 134, from the satellite image data 121 and the map data 122. The extracted regions are candidates for the destination. The map data 122 may not be used. The start-point and end-point setting section 1312 selects spots that serve as candidates for the end point, from the areas or spots extracted by the target area extracting section 1318.

Specifically, the target area extracting section 1318 obtains the land states of the areas from the satellite image data 121 and the map data 122. The target area extracting section 1318 analyzes the satellite image data 121 and refers to the map data 122, as needed, to identify the land states of the areas or the spots. The analysis method for identifying the land states is the same as the analysis methods used by the image analyzing section 1313 and the terrain analyzing section 1314. The target area extracting section 1318 can identify the land states based on only the specified conditions; however, the target area extracting section 1318 may perform analysis at the same level as those of the image analyzing section 1313 and the terrain analyzing section 1314.

The target area extracting section 1318 refers to the land states of the areas, searches for an area or a spot that satisfies a condition for the land state of the destination (target area) managed by the setting condition managing section 134, and extracts the area or the spot. The condition for the land state of the destination includes elements of all or part of the land cover, the terrain, and the land use. The target area extracting section 1318 extracts one or more areas or spots that satisfy the condition.

A description will be given below of an example case where the target area extracting section 1318 extracts, from the satellite image data 121 and the map data 122, regions suitable for tree planting as target areas (destination candidates). When trees are planted in a wide desert area, tree planting is not carried out uniformly over the entire desert area, but areas that are suitable for tree planting may be selected in advance before tree planting, and tree planting may be carried out in the suitable areas in a specified order, in some cases.

An example case where the target area extracting section 1318 extracts areas suitable for tree planting from the satellite image data 121 and the map data 122 will be described below. Examples of areas suitable for tree planting include an area where the progression of desertification, which is obtained from time-series changes in the land state from the past, is slow; a lower area in a slope; and an area having a high soil moisture content.

The target area extracting section 1318 can obtain vegetation areas and vegetation types in the satellite image data from the time-series satellite image data 121 and calculate the degree of changes thereof. For example, the target area extracting section 1318 needs to calculate a vegetation index that uses spectral information of near-infrared and infrared regions, which is called a normalized difference vegetation index (NDVI), and to extract areas having NDVIs equal to or larger than a certain threshold as the vegetation areas.

The target area extracting section 1318 can obtain the vegetation types by comparing the spectra obtained from the satellite image data 121 with the spectrum for each type registered in a database in the secondary storage device 120.

Through the processing, the target area extracting section 1318 extracts a region that shows slower recession of the vegetation area than the other areas. Furthermore, the target area extracting section 1318 can extract a slope area from the terrain data and extract the direction of a slope or the angle of the slope. The target area extracting section 1318 selects an area that satisfies specified conditions, which are managed by the setting condition managing section 134, with respect to the above-described progression of desertification and the information about slopes. Through this target area extracting processing, target areas suitable for tree planting can be extracted. One or more target area may be extracted.

As described above, the route generation device 100 of the second embodiment can extract target areas from the satellite image data 121 and the map data 122 based on the input setting conditions. Thus, it is possible to identify the optimum destination and to present the optimum route to the optimum destination to the user.

Third Embodiment

In the second embodiment, a description has been given of the processing of the route generation device 100 to which the function of extracting destination candidates (target areas) is added. When there are a plurality of target areas, the user may need to determine which area should be the destination or the order in which the user accesses a plurality of destinations. Therefore, in a third embodiment, a description will be given of processing of determining the priorities of a plurality of target areas. Since the other configurations are the same as those of the first and second embodiments, a description will be given below mainly of the differences from the first and second embodiments.

Figure 7:
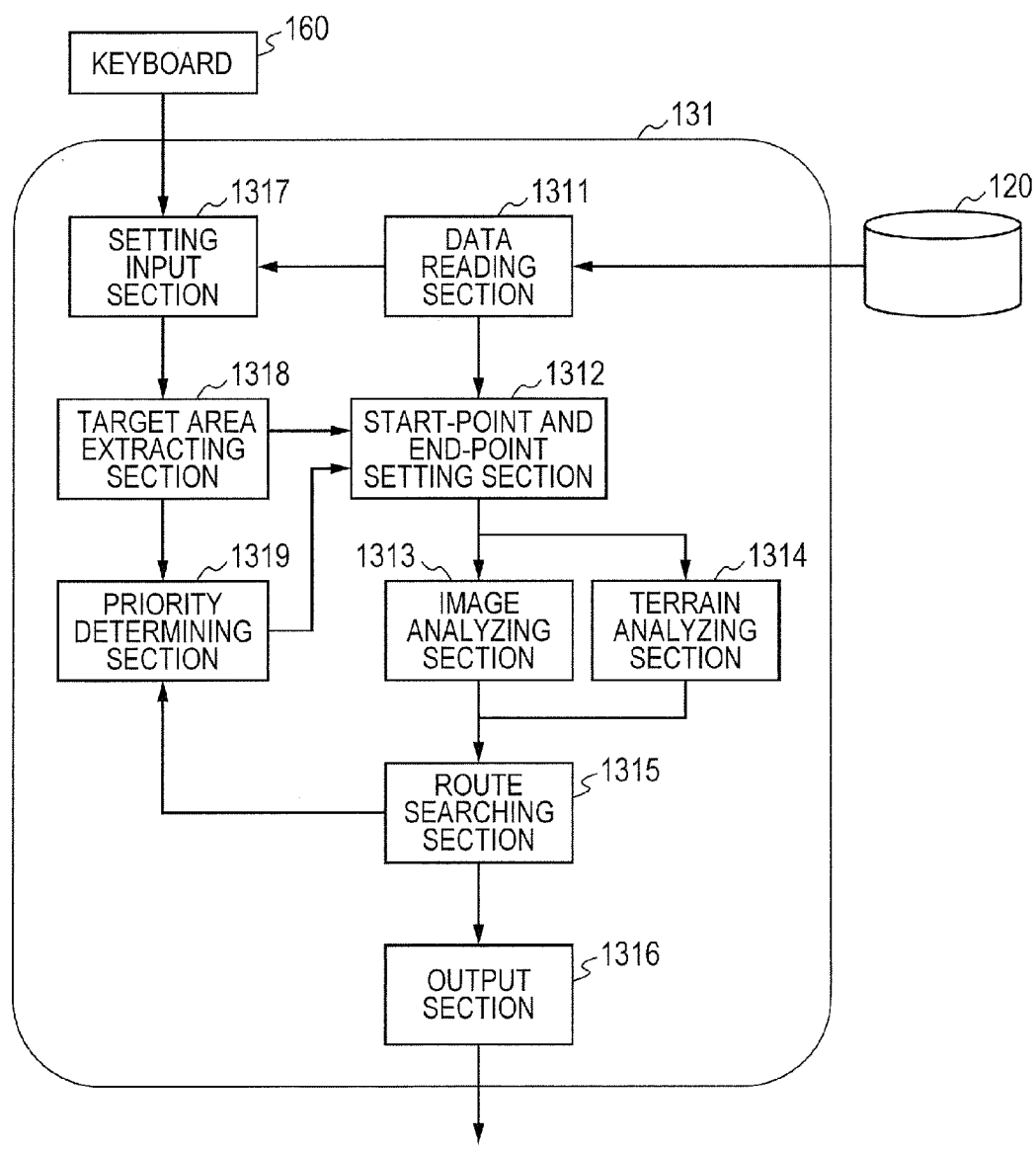
FIG. 7 is a diagram schematically showing a module configuration of a processing engine provided in a route generation device according to a third embodiment.

FIG. 7 is a diagram showing a module configuration of the processing engine 131 provided in the route generation device 100 of the third embodiment. In the third embodiment, the processing engine 131 includes a priority determining section 1319 in addition to the configurations described in the first and second embodiments. FIG. 7 shows an example case where the priority determining section 1319 is added to the configuration shown in FIG. 6.

The priority determining section 1319 is configured as a program module included in the processing engine 131, as in the other functional sections. The priority determining section 1319 receives information about the land states of target areas output from the target area extracting section 1318 and performs priority determining processing. The priority determining section 1319 may obtain analysis results of the image analyzing section 1313 and the terrain analyzing section 1314 and identify the land states of target areas by using the analysis results in order to determine the priorities of the target areas. The priority determining section 1319 may analyze the satellite image data 121 and the map data 122.

The relationships between land states and priorities are defined in advance, and the priority determining section 1319 refers to this definition information to determine the priorities of the target areas. The definition information can be managed by the setting condition managing section 134 and stored in the setting data 123. The definition information is set by the user, is obtained from outside via a network, or is registered in the setting data 123 in advance.

When the priorities are determined based on the land cover in the land state, priority definition information associates the types of the land cover with the priority values. Alternatively, the priority definition information can associate information about temporal changes of the land cover with the priority values. For example, in a case of tree planting, higher priorities are given to a bare area, grassland, and an open forest in this order, and lower priorities are given to wetland and arable land. The degree of progression of a vegetation area or the state of dirt may be associated with the priority.

When the priorities are determined based on the terrain as the land state, the priority definition information associates characteristic values related to the height of each area, such as altitude or a slope angle, with the priority values. For example, in the case of tree planting, a lower priority is given to a steep slope, and a higher priority is given to a flat place. For example, the priority definition information defines priority values for a plurality of ranges of slope angles and defines priority values for a plurality of ranges of altitudes. In addition, the priority definition information may associate the type of the land use state with the priority.

The priority determining section 1319 can determine the priorities of target areas based on routes to the target areas. The priority determining section 1319 determines the priorities based on the total traffic costs of the routes to the target areas. The total traffic costs of the routes can be obtained from the route searching section 1315. For example, the lowest total traffic cost to a target area is used. The definition information defines, for example, the ranges of the traffic cost values and the corresponding priority values.

When priorities for a plurality of conditions (for example, the type of land cover and a slope angle) can be given to a target area, the priority determining section 1319 determine the priority of the target area from one or more of the priorities. For example, the priority determining section 1319 determines the priority value for a single condition specified by the user as the priority value of the target area. Alternatively, the priority determining section 1319 uses the sum of the priorities for the plurality of conditions as the priority value of the target area. At this time, weights may be provided for the conditions. The same applies to a case where a plurality of priority values for an identical condition can be given to a target area, for example, a case where a target area has a plurality of types of land cover.

The priority determining section 1319 may use the size of an area in determining the priority. A higher priority is given to an area having a larger size. For example, the products of the sizes of areas and the priority values determined from the priority definition information are used. When a plurality of priority values for an identical condition can be given to a target area, the priority of the target area is determined from the products of the sizes of areas and the priorities.

As described above, the route generation device 100 of the third embodiment can give, when a plurality of target areas serving as destination candidates are extracted, priorities to the target areas. Furthermore, a route is determined based on the total traffic cost required to go to a target area. Thus, the user can obtain the priorities of construction areas according to the land states and can preferentially select a route having a lower traffic cost required to go to the construction area.

Fourth Embodiment

In the first to third embodiments, descriptions have been given of the processing of searching for the optimum route from the land states when there are no roads between the start point and the end point. On the other hand, there are cases in which roads exist but are not available for traffic due to obstacles. Therefore, in a fourth embodiment, a description will be given of an example configuration in which obstacles on roads are detected, and route search is performed based on the detection. Since the other configurations are the same as those of the first to third embodiments, a description will be given below mainly of the differences from the first to third embodiments.

Figure 8:
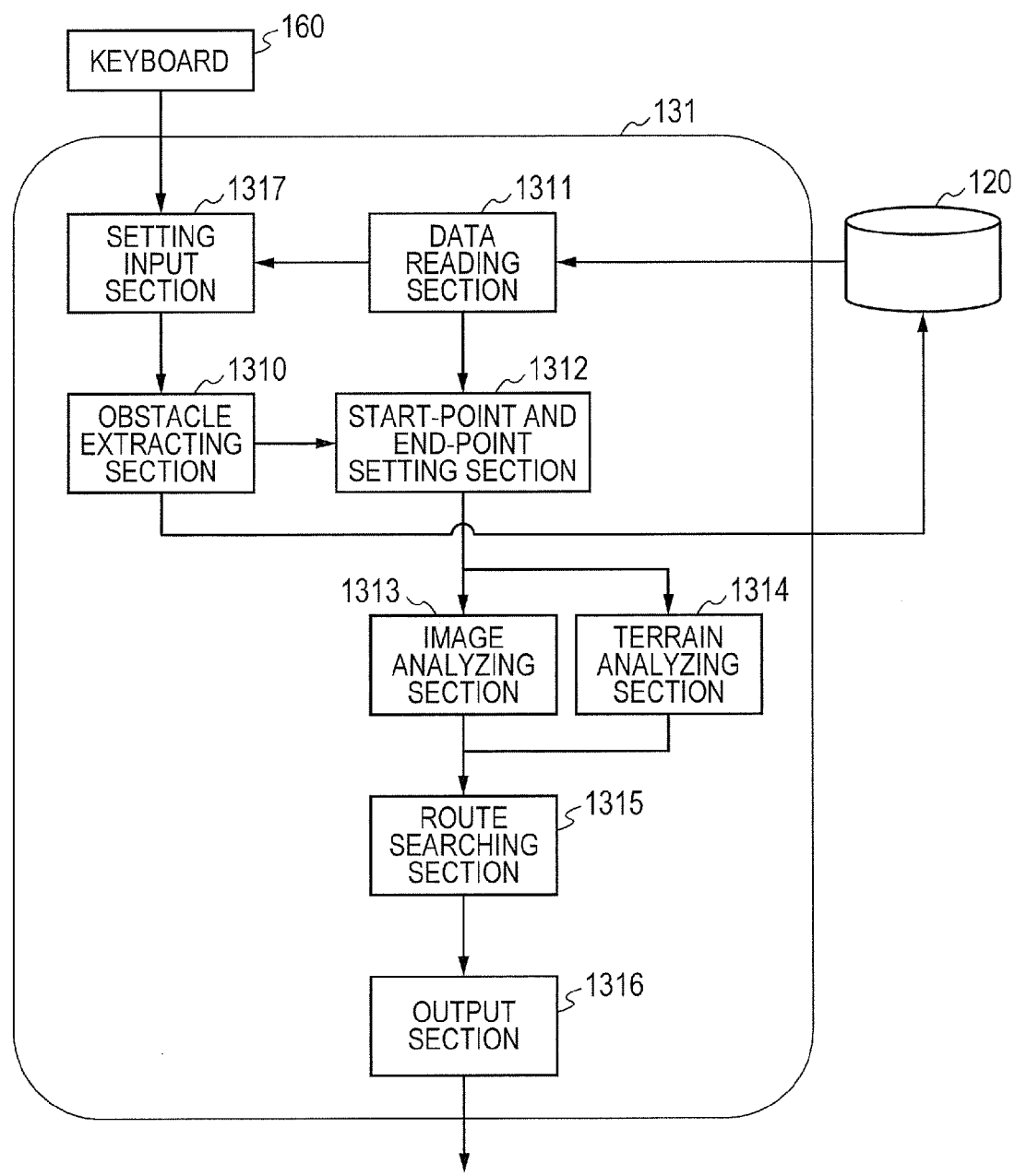
FIG. 8 is a diagram schematically showing a module configuration of a processing engine provided in a route generation device according to a fourth embodiment.

FIG. 8 is a diagram showing a module configuration of the processing engine 131 provided in the route generation device 100 of the fourth embodiment. In the fourth embodiment, the processing engine 131 includes an obstacle extracting section 1310 in addition to the configurations described in the first to second embodiments. FIG. 8 shows an example case where the obstacle extracting section 1310 is provided instead of the target area extracting section 1318 in the configuration described with reference to FIG. 6.

The obstacle extracting section 1310 is configured as a program module included in the processing engine 131, as in the other functional sections. The obstacle extracting section 1310 receives a condition for obstacles from the setting input section 1317, analyzes the satellite image data 121 read by the data reading section 1311 by referring to the map data 122, as needed, and extracts an area where there are obstacles. The obstacles are rubble on roads, for example.

To extract obstacles, the above-described clustering in feature space can be used. For example, the texture or the feature amount in spectra can be used. As an example case, it is assumed that rubble having a size that can be easily checked on the satellite image data 121 exists on a road. The obstacle extracting section 1310 aligns the satellite image data 121 and the map data 122 by using the location information of them and extracts road areas. The obstacle extracting section 1310 extracts a rubble area from the satellite image data 121.

The obstacle extracting section 1310 extracts, for example, an area having something similar to rubble specified by the user on the satellite image data 121 displayed on the display unit 140. A feature of rubble may be stored in advance in the secondary storage device 120, and an area that has a feature identical thereto may be extracted. A single rubble area or a plurality of rubble areas may be extracted.

When the extracted rubble area exists on a road, the obstacle extracting section 1310 adds an attribute to the road according to the rubble distribution state. For example, an attribute of impassable is added if the rubble is distributed over the width of the road, and an attribute of cautiously passable is added if the rubble is distributed on part of the road. The obstacle extracting section 1310 stores road data to which the attribute information has been added, in the secondary storage device 120.

The route searching section 1315 uses the attribute information, which indicates the traffic states of roads, to search for a route passing through roads on the map data 122. The output section 1316 displays the found route on the display unit 140 and also displays the traffic states of roads, such as severed roads. The output section 1316 may output them to the printer 150.

As described above, the route generation device 100 of the fourth embodiment determines the traffic states of existing roads from the satellite image data, outputs the current road traffic states as the attributes of road data, and accumulates them in the secondary storage device 120. The route searching section 1315 performs route search reflecting the current states by using the road data holding the traffic states. Thus, even when it is difficult to pass through roads due to obstacles, the optimum route can be found and presented to the user.

Fifth Embodiment

In the fourth embodiment, a description has been given of the processing in which the locations where obstacles exist are extracted by the obstacle extracting section 1310, the current road states are determined, and the optimum route that passes through roads is searched for. When a road is severed, grasping the severed spot in the road and searching for an appropriate order to access the severed spot may be demanded in order to repair the road or to remove obstacles.

Furthermore, searching for an efficient round-trip route to an obstacle dump and an obstacle loop route may be demanded to remove obstacles. After removing the obstacles, routes accessible to other obstacles are changed. In a fifth embodiment, a description will be given of a configuration in which the obstacle extracting section 1310 extracts severed-road information and reflects the severed-road information in the traffic cost to determine priorities of access from the dump to a plurality of obstacles and to search for routes.

When an obstacle exists on a route that passes from the start point to the destination and that has the lowest traffic cost, the route generation device 100 of the fifth embodiment presents route information to the user, in consideration of a work cost for removing the obstacle and a traffic cost of another route that detours the obstacle. A description will be given below mainly of the differences from the first to fourth embodiments.

Figure 15:
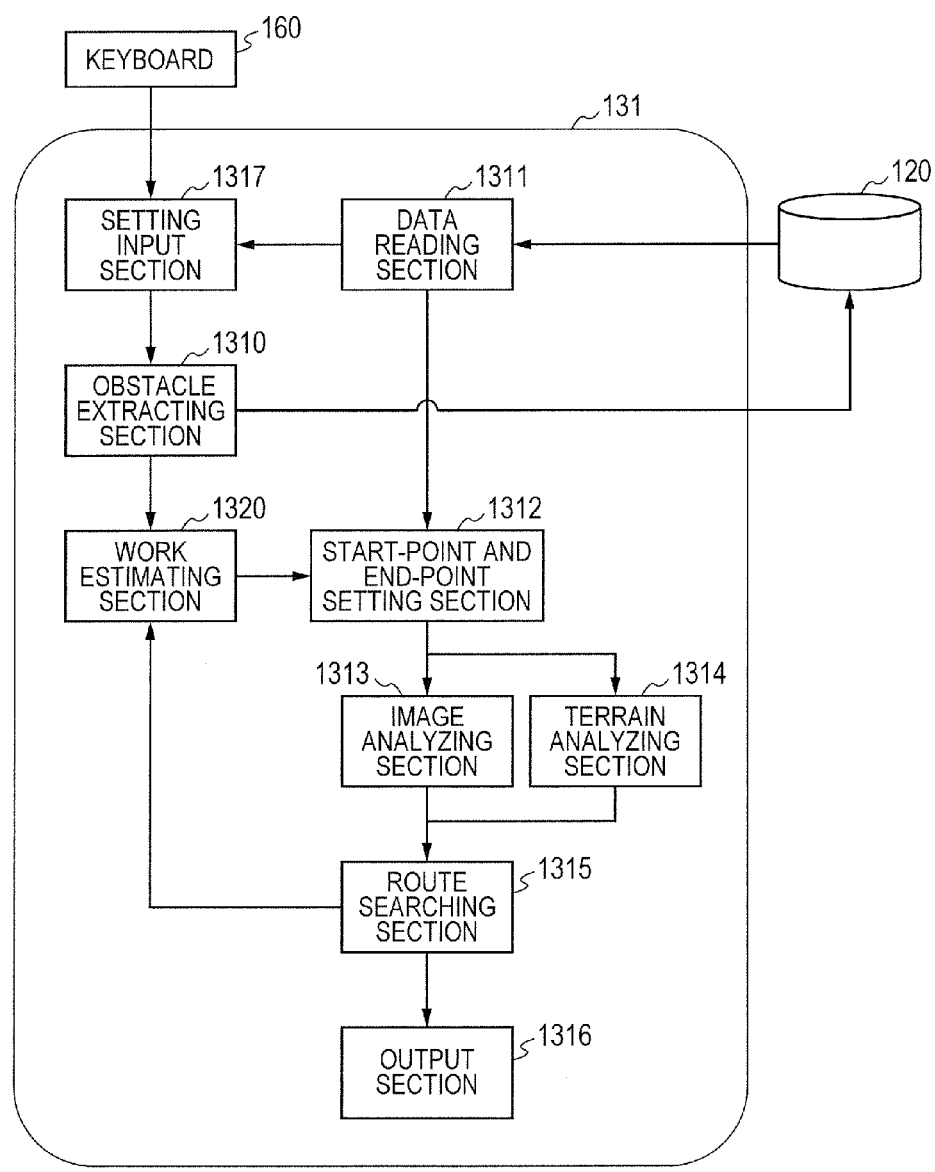
FIG. 15 is a diagram schematically showing a module configuration of a processing engine provided in the route generation device according to the fifth embodiment.

FIG. 15 is a diagram showing a module configuration of the processing engine 131 provided in the route generation device 100 of the fifth embodiment. In the fifth embodiment, the processing engine 131 includes a work estimating section 1320 in addition to the configuration described in the fourth embodiment.

Figure 9:
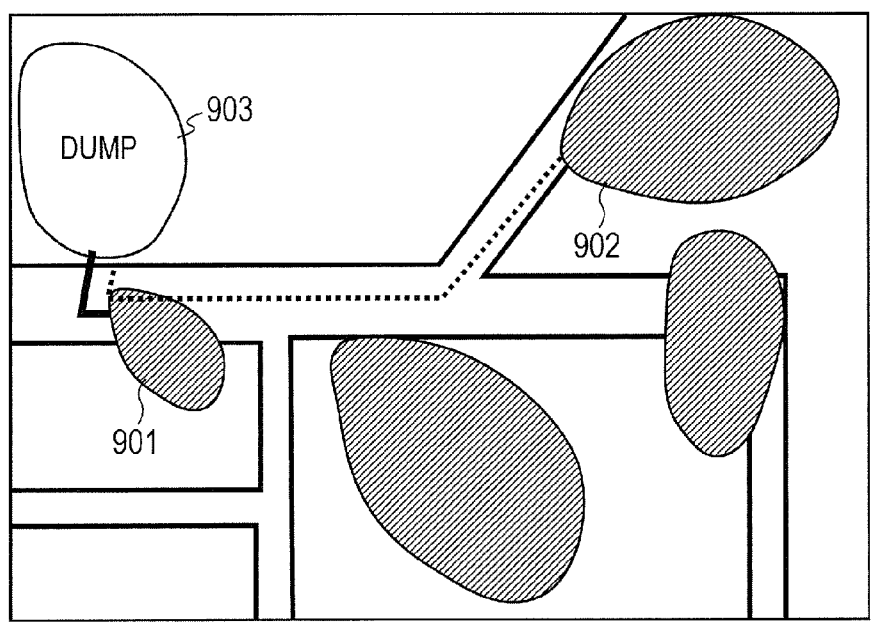
FIG. 9 is a conceptual diagram for explaining processing in which a route generation device according to a fifth embodiment generates a route.

FIG. 9 is a conceptual diagram showing an example case where the route generation device 100 of the fifth embodiment searches for the optimum route when an obstacle 901 and an obstacle 902 exist on roads, and a worker shuttles on the roads between the obstacles 901 and 902 and a dump 903. If the worker removes the obstacles on the roads and transports the removed obstacles to the dump by a work vehicle, it is difficult to access from the obstacle 902 to the dump 903 because the road from the obstacle 902 to the dump 903 is severed by the obstacle 901.

Therefore, in this embodiment, the satellite image data 121 and the map data 122 are analyzed to grasp the current states, and the start point and the end point are sequentially changed, thereby generating routes to a plurality of target spots. Furthermore, when another obstacle exists on a route to a target obstacle, a cost for removing the obstacle and a cost for using another route are calculated and presented to the user. In this embodiment, the cost for removing an obstacle is defined by the same rule as the traffic cost such that they can be compared.

A description will be given below of processing of the modules performed when rubble exists at a plurality of spots on roads, a priority order is given to a plurality of rubble areas, and the rubble is separately transported to the dump several times. For example, the user inputs the location or area of the dump by using the keyboard 160 or the mouse 170. The user may specify the location or area on the display unit 140 by using the mouse 170 or may input location information, such as latitude and longitude, indicating the location of the dump by using the keyboard 160.

The user may input a criterion of selecting rubble to be preferentially removed. Examples of the criterion of selection include a setting in which a larger quantity of rubble existing on roads is preferentially removed. To input the criterion of selection, the user selects from or ranks area names, such as a road area and a house area, shown on the display unit 140. Furthermore, the above-described setting may be input in natural language. A higher priority may be given to rubble having a lower traffic cost. In that case, rubble is accessed and removed in ascending order of traffic cost. A description will be given below on the assumption that the user sets a criterion of selection such that a larger quantity of rubble existing on a road is preferentially removed.

The setting input section 1317 receives the location of the dump and the criterion of selection, which are input by the user, and transmits them to the setting condition managing section 134. For example, the user sets the criterion of selection such that a larger quantity of rubble on a road is preferentially removed. The obstacle extracting section 1310 analyzes the satellite image data 121 to extract an area having rubble, which is an obstacle, as described in the third embodiment. The obstacle extracting section 1310 selects an obstacle existing on the road from the extracted rubble area. The rubble area is an area where rubble removing work is performed.

In the example shown in FIG. 9, the obstacle 901 and the obstacle 902 satisfy the criterion of selection specified by the user. The obstacle extracting section 1310 may extract all rubble areas and display the extracted rubble areas on the display unit 140, and the user may specify a rubble area having a higher priority. When the criterion of selection is not specified by the user, the priority of rubble is determined based on the traffic cost to the dump. This is determined by setting the priority on routes indicated by the route searching section 1315, to be described later, in ascending order of traffic cost.

The obstacle extracting section 1310 extracts severed-road information from the distribution state of the extracted rubble and adds the severed-road information to the map data as attribute information. When a severed road is repaired through the subsequent rubble removing work, the obstacle extracting section 1310 updates the severed-road information by making passable the area portion where the severed road is repaired.

The severed road may be defined by giving the maximum value to the traffic weight of this road, or the road network on the data may be cut to indicate the severed road. The obstacle extracting section 1310 may recognize completion of the rubble removal by analyzing the current satellite image data 121 again. Alternatively, the user may receive an instruction of work completion and input the severed-road information to the route generation device 100, and the obstacle extracting section 1310 may receive the severed-road information from the setting input section 1317 and update the map data.

The work estimating section 1320 estimates the quantity of target rubble and estimates the quantity of work (cost) required for removing the rubble. The work estimating section 1320 receives information about the rubble area extracted by the obstacle extracting section 1310 and estimates the size of the rubble area. The work estimating section 1320 calculates an approximate quantity of rubble from the size of the rubble area. The quantity of rubble may be obtained by multiplying the size of the rubble area by a constant or may be obtained by estimating the height of rubble from a stereo image acquired at a satellite or an aircraft and multiplying the size of the rubble area by the estimated height.

The work estimating section 1320 may extract information about the height of rubble from the height of a land surface estimated from data of a laser installed in an aircraft etc. The work estimating section 1320 estimates the quantity of rubble removing work by dividing the calculated quantity of rubble by the loading capacity of work equipment to be used by the user. The quantity of work is estimated, for example, to be 20-times shuttles with a 10-ton truck. Data about the loading capacities of work vehicles will be described in a sixth embodiment, to be described later.

The start-point and end-point setting section 1312 receives the location of the dump from the setting condition managing section 134 and sets the start point at the dump 903. Furthermore, the start-point and end-point setting section 1312 sets the end points at the areas of the obstacle 901 and the obstacle 902. Conversely, the start points may be set at the obstacles, and the end point may be set at the dump.

The route searching section 1315 searches for routes between the start point and the end points, set by the start-point and end-point setting section 1312. Since the severed-road information is added to the map data 122 as an attribute, the route searching section 1315 searches for routes that do not pass through the severed road. The route searching section 1315 first selects searchable routes between the start point and the end points from among passable roads and then selects, from among the searchable routes, a route having the lowest total traffic cost as a route to be presented to the user. The route searching section 1315 may select a plurality of routes having total traffic costs lower than the others.

In a preferred configuration, the route searching section 1315 calculates the total traffic cost of a route when the route becomes passable after removing the obstacle 901 and is to be used. The total traffic cost includes the traffic cost of the route obtained after the route becomes passable and the work cost for removing the obstacle 901 (traffic cost conversion).

The work cost for removing the obstacle 901 can be calculated from the quantity of the work estimated by the work estimating section 1320. As described above, the work estimating section 1320 estimates the quantity of work from the number of times of transportation using a work vehicle. The setting data 123 stores a cost weight corresponding to work other than transportation of rubble, such as loading and unloading rubble onto and from the vehicle, and the product of the cost weight and the above-described estimated quantity of work is a work cost other than the cost for transportation. Note that the work cost other than the cost for transportation may not be taken into consideration, depending on design.

The route searching section 1315 searches for a route that passes from the dump to the obstacle 901 and that has the lowest traffic cost. On the assumption that the number of times of transportation is equal to the number of round trips between the obstacle and the dump, the route searching section 1315 calculates the product of the traffic cost and twice the number of times of transportation. This product is the total traffic cost for transportation work. The sum of the total traffic cost for transportation work and the cost for the other work is the total cost for the rubble removing work.

For routes to the obstacle 902, the route searching section 1315 calculates a route that detours the obstacle 901 and a traffic cost thereof; and a route that becomes passable after removing the obstacle 901 and a traffic cost that includes the removing work cost. To calculate the latter traffic cost, the route searching section 1315 calculates a route used to remove the obstacle 901 and a traffic cost thereof; and a route obtained after the obstacle 901 is removed and a traffic cost thereof.

The output section 1316 displays the above-described routes and traffic costs on the display unit 140 to present them to the user. Specifically, the output section 1316 displays the route that detours the obstacle 901 and the traffic cost thereof; and the route that becomes passable after the obstacle 901 is removed and the traffic cost thereof. The work cost for removing the obstacle 901 and the traffic cost of the route obtained after the obstacle 901 is removed are also individually displayed. The output section 1316 may output the same contents to the printer 150. The user can choose between work for removing the obstacle 901 or access to the obstacle 902 while detouring the obstacle 901.

A description has been given above of the case where, when there is rubble on roads, routes for removing the rubble are presented to the user. Furthermore, this embodiment can also be applied to a case where routes to a plurality of tree planting areas (areas where tree planting will be performed) are presented. The tree planting areas are work areas where tree planting is performed. A description will be given below of route search for tree planting areas, as an example case to which this embodiment is applied. In the above-described rubble removing case, routes from the dump to the obstacles are searched for. However, in the case of route search for tree planting areas, it is assumed that routes from a wood yard to the plurality of tree planting areas are searched for.

The obstacle extracting section 1310 extracts an area where tree planting has already been performed. It is difficult for a vehicle to pass through the area where tree planting has already been performed. The obstacle extracting section 1310 may extract a vegetation area from the satellite image data 121 as an area where tree planting has already been performed or may identify such an area upon reception of the completion of tree planting, input by the user.

For the target tree planting areas, the work estimating section 1320 estimates the number of trees to be planted from the sizes of the tree planting areas and estimates the quantity of work required therefor. The tree planting areas satisfy the criterion of selecting a tree planting area, specified by the user, and are extracted by the target area extracting section 1318, as described above.

The work estimating section 1320 can estimate the quantity of work on the basis of the number of times of transportation from the loading capacity of a truck used for transporting trees, for example. The start-point and end-point setting section 1312 sets the wood yard as the start point and sets the respective tree planting areas as the end points.

The route searching section 1315 searches for routes from the start point set by the start-point and end-point setting section 1312 to the end points set in the respective tree planting areas. Note that, when a tree planting area exists on a route, if planting work is started from that tree planting area (having a high priority determined based on the user's criterion of selection) on the route, this area becomes impassable upon completion of tree planting, so that the route to another tree planting area is severed.

Therefore, the route searching section 1315 determines whether a tree planting area exists on each route. If a tree planting area exists on each route, the route searching section 1315 searches for a route passing through that tree planting area and also a detour route on the assumption that the route is severed by that tree planting area. Specifically, the route searching section 1315 updates the road attribute information of the map data 122 and performs route search. Furthermore, the route searching section 1315 calculates, for both the route passing through the tree planting area and the detour route, work costs required for tree planting from the quantity of work calculated by the work estimating section 1320.

In this example, to calculate a work cost, a cost (traffic cost) for transportation work for tree planting is calculated. The route searching section 1315 can calculate the total traffic cost for transportation work, from the calculated traffic cost of the route and the number of times of tree transportation. Specifically, on the assumption that one-time transportation corresponds to a round trip of the route, the product of the traffic cost and twice the number of times of transportation can be used as the total traffic cost for the tree planting work.

In a specific example, it is assumed that there are a tree planting area A and a tree planting area B, and the tree planting area A exists on a route to the tree planting area B. It is also assumed that the tree planting area A satisfies the criterion of selection specified by the user and has a higher priority for tree planting than the tree planting area B. According to the designation of the user, tree planting work is started from the tree planting area A. However, when tree planting for the tree planting area B is performed after tree planting for the tree planting area A is completed, it is difficult to pass through a route to the tree planting area B, which has the lowest cost.

The route searching section 1315 calculates a route and a traffic cost in which the number of round trips required for tree planting work in the tree planting area B performed when there are no severed roads is reflected. Furthermore, the route searching section 1315 calculates a route and a traffic cost in which the number of round trips required for tree planting work in the tree planting area B performed when there are severed roads is reflected. The output section 1316 displays the routes and the traffic costs on the display unit 140 and presents them to the user. This processing presents to the user changes in the routes and in the traffic costs required for work and helps the user to determine the order of selecting the tree planting areas.

In route search for the above-described two types of work, routes from a single spot (the dump or the wood yard) to a plurality of target areas are searched for. Unlike in such route search, the route generation device 100 can search for a tour route for a plurality of target areas.

When a first destination is reached, the start-point and end-point setting section 1312 sets the first destination as the start point and excludes the first destination from the destinations. The start-point and end-point setting section 1312 sets all the other target areas as end points, and the route searching section 1315 performs route search. A route that has the lowest traffic cost and the corresponding end point are selected from among found routes. By appropriately changing the start point as described above, a tour route can be determined according to the current road states.

As described above, in the route generation device 100 of the fifth embodiment, the obstacle extracting section 1310 extracts an obstacle area on a route, and the route searching section 1315 searches for a round-trip route from the spot specified by the user to the obstacle area. Furthermore, when there are a plurality of obstacle areas, the route searching section 1315 presents, to the user, routes and traffic costs calculated with the quantity of work for obstacles being taken into account. Thus, when a road is severed by obstacles etc., the order of work in a plurality of areas and routes can be presented to the user.

Sixth Embodiment

In the fifth embodiment, a description has been given of the example case where the route generation device 100 includes the obstacle extracting section 1310, detects obstacles on roads, and searches for routes to the obstacles. Here, specialized vehicles, such as heavy equipment, are required to remove obstacles etc. Heavy equipment can pass through roads that are wide enough but cannot pass through narrow roads or curved roads, in some cases.

Figure 10:
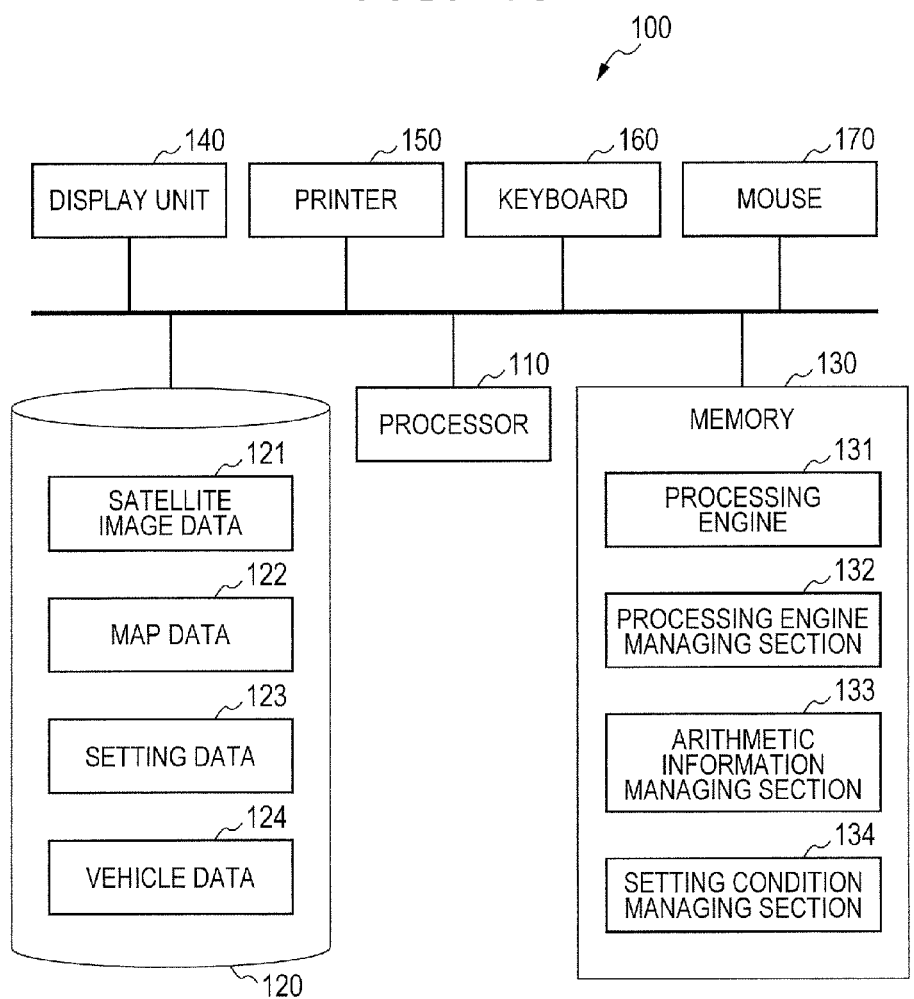
FIG. 10 is a functional block diagram schematically showing the configuration of a route generation device according to a sixth embodiment.

Therefore, in a sixth embodiment, a description will be given of the route generation device 100 that uses information about heavy equipment etc., which is stored in advance, to present only passable routes to the user. An example case where obstacles are removed by heavy equipment will be described below. FIG. 10 is a functional block diagram of the route generation device 100 according to the sixth embodiment. In the route generation device 100 of the sixth embodiment, the secondary storage device 120 stores vehicle data 124 in addition to the configuration described in the first to fifth embodiments.

FIG. 11 is a diagram showing an example structure and example data of the vehicle data 124. The vehicle data 124 describes the size, the minimum road width which a vehicle can pass through, and other data of a vehicle. Furthermore, the vehicle data 124 describes the land states of passable roads. For example, the vehicle data 124 shows whether the corresponding vehicle type can pass through paved roads, gravel, dirt, and rocky tracts.

In S506 of the flowchart shown in FIG. 5, the route searching section 1315 receives the map data 122 and the vehicle data 124 about a vehicle that is specified in advance by the user. According to traffic costs received from the image analyzing section 1313 and the terrain analyzing section 1314, the route searching section 1315 searches for the shortest route when the vehicle passes through existing roads. The route searching section 1315 determines passability of the selected route by comparing the size which the vehicle can pass though, which is described in the vehicle data 124, with the road widths and the curvatures, which are described in the map data 122.

A description will be given below of determination of passability by using the example data shown in FIG. 11. When heavy equipment 1 shown in FIG. 11 passes through a road, the road needs to have a width of 2.3 meter or more. The route searching section 1315 searches additional information of the map data 122 to determine whether a road having a width of 2.3 meter or less is included in the shortest route extracted as a candidate. If a road having a width of 2.3 meter or less is included in the extracted shortest route, the route searching section 1315 determines that this road is impassable for the heavy equipment 1.

Furthermore, if there is a corner on the route, the route searching section 1315 determines passability from the width of the road, the angle of the corner, and the width and the length of the heavy equipment 1. If the selected heavy equipment 1 cannot pass through this corner, the route searching section 1315 determines that the corresponding road is impassable.

The route searching section 1315 gives the maximum traffic cost to this corner on the road that has been determined to be impassable. When heavy equipment 2 is selected by the user, the result of determination of passability of the road is changed because the width, the length, etc. of the equipment are different. In other words, a route to be searched for is different depending on equipment.

When an impassable place exists on a route found through the above-described procedure, the route searching section 1315 adds the impassable place to the map data 122 as an attribute and stores it in the secondary storage device 120. When there is an impassable place, the route searching section 1315 again searches for a route having the lowest traffic cost.

Furthermore, it is conceivable that all existing roads are impassable. In that case, in the route generation device 100, the image analyzing section 1313 analyzes the satellite image data 121 to identify the land states of areas other than roads. For example, the land states to be identified include the land use state, the land cover, whether the land is paved or not, and whether the land has an obstacle or not.

When the roads are impassable, the route searching section 1315 compares, in areas other than the roads, the identified land states with the passable land states held by the vehicle data 124 to search for a route passing through a passable area. Thus, even though there are no passable roads, it is possible to search for a route passing through areas other than the roads and to present it to the user.

In addition, a vehicle to be used may be changed according to the road states. In that case, the route generation device 100 can select, from among a plurality of vehicles described in the vehicle data 124, a vehicle that can pass through a route having the lowest traffic cost found by the route searching section 1315 and can present the route and the vehicle to be used to the user. As described above, the route generation device 100 of the sixth embodiment can select, from the vehicle data 124 about a vehicle to be used and the map data 122, a road through which the vehicle can pass, and can present the optimum route to the user.

Specific descriptions have been given above of the inventions made by the inventors based on the embodiments. However, the present invention is not limited to the above-described embodiments, and it is needless to say that various modifications can be made without departing from the scope thereof.

All or part of the above-described configurations, functions, and processing sections can be realized by hardware when integrated circuits are used in design, for example, or can be realized by software when the processor executes programs for implementing the respective functions. The programs for implementing the respective functions and information of tables can be stored in storage units, such as a memory and a hard disk, and in permanent storage media, such as an IC card and a DVD.

The route generation device configured by a single computer has been described in each of the above-described embodiments; however, a route generation system can be configured by a single computer or a plurality of computers that perform respectively allocated processing. The structures of the functional sections in the above-described configurations are merely examples, and part of the processing of a particular functional section may be performed by another functional section in the above-described configurations.

What is claimed is:

1. A route generation system that generates a route between a start point and an end point, comprising:
    an analysis section that analyzes aerial image data of a land planform to identify land states of every pixels or segment areas composing an objective area included in the aerial image data, and that zones the objective area into a plurality of zones, each of which falls into one of predetermined number of land state types;

a storage section that stores traffic cost information that indicates each traffic-cost coefficient representing degree of traffic difficulty in each of said predetermined plural number of land state types; and a route search section that calculates for each of a plurality of routes from the start point to the end point, traffic costs of a plurality of route segments which are serial segments of the corresponding route each being segmented by border of zones, by multiplying length of each of route segments by a corresponding traffic-cost coefficient, and that sums the traffic costs of the plurality of route segments to derive a total traffic cost of each of the plurality of routes, and that determines a route candidate to be used from the start point to the end point based on the calculation results.

2. The route generation system according to claim 1, wherein the storage section stores map data of the objective area included in the aerial image data, wherein the analysis section uses location information of a road included in the map data to identify the road on the aerial image data, and wherein the route search section calculates a total traffic cost of a route that includes the identified road by referring to the traffic cost information.

3. The route generation system according to claim 2, wherein the analysis section identifies terrain states and land cover states of every pixels or areas when zoning the land planform, and wherein the route search section calculates the total traffic cost from the identified terrain state and land cover state, by referring to the traffic cost information.

4. The route generation system according to claim 2, further comprising:

an obstacle extracting section that extracts an obstacle area from the analysis result of the aerial image data and that gives severed-road information to the map data, from a road location obtained from the map data and the location of the extracted obstacle area.

5. The route generation system according to claim 1, wherein the storage section stores a route search condition for specifying an area to be excluded from a route search range, and wherein the route search section searches for the route candidate to be used, in an area where the area specified by the route search condition is excluded.

6. The route generation system according to claim 1, wherein the storage section further stores target area information that indicates a feature of a target area serving as a destination candidate, and wherein the route generation system further comprises:
a target area extracting section that extracts, as a target area, an area showing the feature of the target area from the aerial image data by referring to the target area information; and an end-point setting section that sets the target area extracted by the target area extracting section, as the end point.

7. The route generation system according to claim 6, wherein the storage section further stores priority information that associates priority used to set, as the end point, the target area extracted by the target area extracting section with a land state of the target area, and wherein the route generation system further comprises a priority determining section that determines priorities for a plurality of target areas extracted by the target area extracting section from land states of the plurality of target areas, by referring to the priority information.

8. The route generation system according to claim 1, further comprising:

an output section, wherein the route search section searches for routes to a plurality of work areas where work is performed, wherein, when a second work area exists in a first route from the start point to a first work area, and passability/impassability of the second work area is changed due to work in the second work area, the route search section calculates a traffic cost of a second route that detours the second work area and a work cost that includes a traffic cost of a round trip between the start point and the second work area for the work in the second work area, and wherein the output section outputs the first route, the work cost, the second route, and the traffic cost of the second route.

9. The route generation system according to claim 1, wherein the analysis section more particularly zones the objective area into at least three zones, each of which falls into a mutually-differing one of the predetermined number of land state types.

10. A route generation method of generating a route between a start point and an end point, comprising:

analyzing, with a calculation section, aerial image data of a land planform to identify land states of every pixel or segment area composing an objective area included in the aerial image data, and zoning the objective area into a plurality of zones, each of which falls into one of a predetermined number of land state types;

storing, with a storage section, traffic cost information that indicates each traffic-cost coefficient representing degree of traffic difficulty in each of the predetermined plural number of land state types;

calculating, with the calculation section, for each of a plurality of routes from the start point to the end point, traffic costs of a plurality of route segments which are serial segments of the corresponding route each being segmented by border of zones, by multiplying length of each of route segments by a corresponding traffic-cost coefficient;

summing the traffic costs of the plurality of route segments to derive a total traffic cost of each of the plurality of routes, determining a route candidate to be used from the start point to the end point based on the calculation results; and displaying, with a display section, the route candidate to be used.

11. The route generation method according to claim 10, wherein the storage section stores map data of the objective area included in the aerial image data, wherein the calculation section identifies a road on the aerial image data from location information of the road included in the map data, and wherein the calculation section calculates a traffic cost of a route that includes the identified road by referring to the traffic cost information.

12. The route generation method according to claim 10, wherein the analyzing more particularly zones the objective area into at least three zones, each of which falls into a mutually-differing one of the predetermined number of land state types.

13. A non-transitory program product for causing a computer system that includes a processor and a storage unit to execute processing of generating a route between a start point and an end point, the program product causing the processor to execute operations of:

analyzing aerial image data of a land planform to identify land states of every pixel or segment area composing an objective area included in the aerial image data and zoning the objective area into a plurality of zones, each of which falls into one of a predetermined number of land state types;

referring to traffic cost information that is stored in the storage unit and that indicates each traffic-cost coefficient representing degree of traffic difficulty in each of the predetermined plural number of zone-types;

calculating, for each of a plurality of routes from the start point to the end point, traffic costs of a plurality of route segments which are serial segments of the corresponding route each being segmented by border of zones, by multiplying length of each of route segments by a corresponding traffic-cost coefficient;

summing the traffic costs of the plurality of route segments to derive a total traffic cost of each of the plurality of routes, border of zones; and determining a route candidate to be used from the start point to the end point based on the calculation results of the traffic costs.

14. The non-transitory program product according to claim 13, further causing the processor to execute operations of:

referring to map data of the area included in the aerial image data, the map data being stored in the storage unit;

identifying a road on the aerial image data from location information of the road included in the map data; and calculating a traffic cost of a route that includes the identified road by referring to the traffic cost information.

15. The non-transitory program product according to claim 13, wherein the analyzing more particularly zones the objective area into at least three zones, each of which falls into a mutually-differing one of the predetermined number of land state types.

\* \* \* \* \*